June 23, 1953     J. T. ROONEY     2,642,775
VERTICAL ILLUMINATOR
Filed Dec. 21, 1949
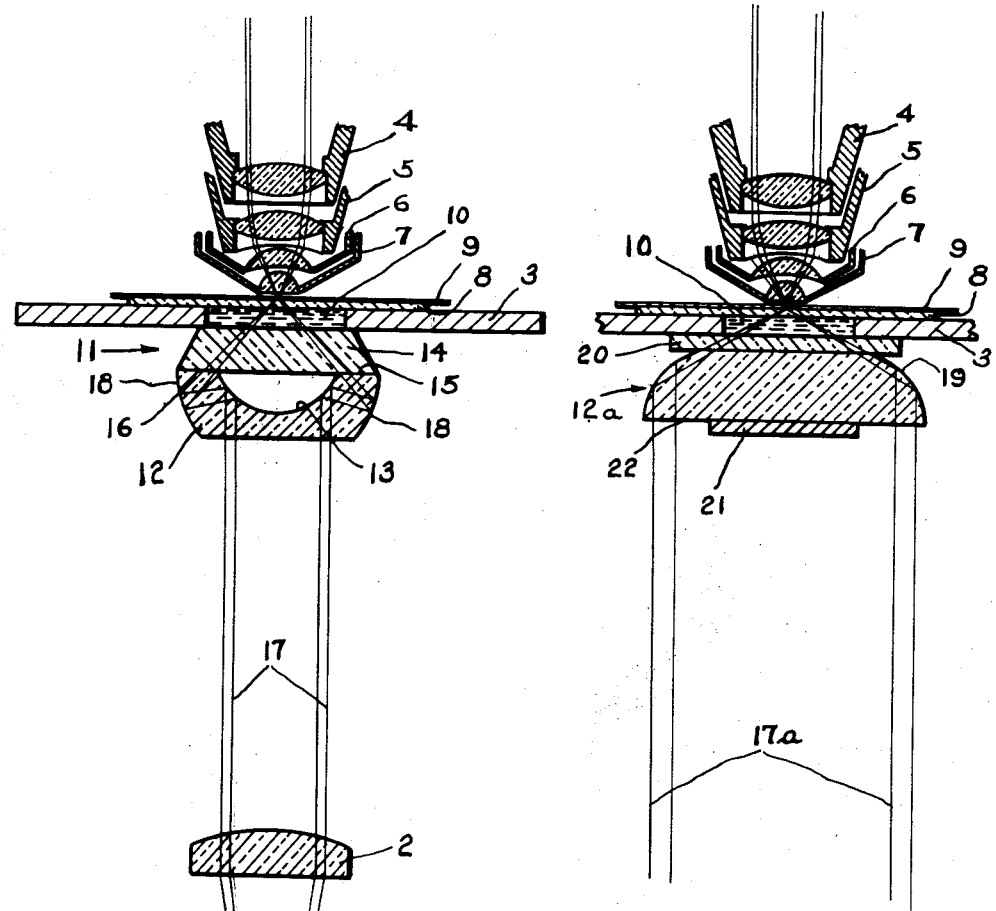
Fig.1.
Fig.2.
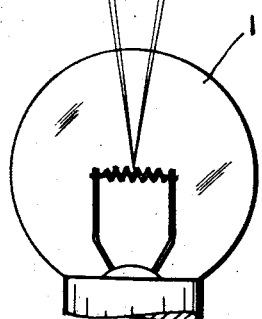
INVENTOR.
JOHN T. ROONEY
BY Raymond A. Paquin
ATTORNEY Patented June 23, 1953

2,642,775

UNITED STATES PATENT OFFICE 2,642,775

VERTICAL ILLUMINATOR

John T. Rooney, West Palm Beach, Fla.

Application December 21, 1949, Serial No. 134,200

3 Claims. (Cl. 88—40)

This invention relates to microscopes or the like and has particular reference to a new and improved illuminating device for such instruments and the process of making the same.

An object of the invention is to provide a new and improved illuminating device for microscopes or the like and the process of making the same.

Another object of the invention is to provide an illuminator of the type set forth which is relatively economical to manufacture yet efficient in operation.

Another object of the invention is to provide a device of the type set forth and the process of making the same and wherein the device may be formed of a moldable material and provided with wear resisting contacting elements or surfaces.

Another object of the invention is to provide a device of the type set forth which is formed by molding or casting plastic or resin material of suitable form and to which is secured a wear resisting cover of glass or the like.

Another object of the invention is to provide a new and improved method of making an illuminator of the type set forth above.

Another object of the invention is to provide a device of the type set forth and a method of making the same wherein the grinding and polishing of precision optical surfaces is eliminated, or is reduced to a minimum.

Other objects and advantages of the invention will be apparent from the following description taken in connection with the accompanying drawings.

It will be understood that changes may be made in the details of construction and arrangement of parts without departing from the scope of the invention as set forth in the accompanying claims.

Referring to the drawings:

Fig. 1 is a sectional view of one form of illuminator embodying the invention and showing the same position in the optical system of a microscope; and Fig. 2 is a view generally similar to Fig. 1 but showing a modified form of the invention.

Referring more particularly to the drawings wherein similar reference characters designate corresponding parts throughout the various views, the arrangement shown in Fig. 1 consists of the microscope illuminator or lamp 1, condenser 2, microscope stage 3 and supports 4, 5, 6 and 7 for the various optical elements of the microscope objective lens system.

On the microscope stage 3 is shown an object slide 8 over which is positioned the cover glass 9. The microscope stage 3 is provided with the opening 10.

Through the opening 10 in the microscope stage 3, and optically aligned with the lamp 1 and condenser 2 as well as the objective lens system, is positioned the illuminator of the dark field type designated generally at 11 in the form shown in Fig. 1 and as 12a in the form shown in Fig. 2, so that optical contact is made with the object slide by interposing an oil of suitable index.

In Fig. 2 the lamp or light source 1 and condenser 2 have been omitted as they may be of the form shown in Fig. 1.

In the form of the invention shown in Fig. 1, which is of the cardiod type, the principal element 12 is formed by molding by the use of suitable dies in a plastic molding press or casting by centrifugal or other known methods. The said dies have highly polished surfaces to provide surfaces of good quality on the finished optical element. The optically reflecting surfaces are finally coated with a highly reflecting metallic deposit, by known processes.

Methyl methacrylate is an example of a suitable material plasticized or unplasticized, when polymerized, but any suitable clear resin, capable of being molded or cast to accurate dimensions, may be used.

As the dies or mold employed have highly polished surfaces, the finished element will have surfaces of good quality without the necessity of the usual grinding and polishing operations.

The element 12 is formed with the spherically curved or depressed inner surface 13 which is then formed into a reflective surface such as by silvering by chemical deposit or plating in the manner of forming of reflective surfaces on glass mirrors. The spherically curved surface 18 is similarly coated for total reflection.

The cover glass 14 is of glass and is formed by molding and grinding and polishing the surfaces thereof. This member 14 is formed preferably with plane and parallel upper and lower surfaces although the lower surface could be of desired configuration. The peripheral edges 15 of this cover glass 14 which engage the peripheral edge 16 of the molding member 12 are then secured together by the use of optical cements of suitable refractive index.

The collimated light rays 17 from the light source 1 then strike the reflecting surface 13 from which they are reflected to the reflective surface 18 on the member 12 by which they are directed through the homogeneous media 18, the cover glass 14, the contact oil and the slide to the object under examination and brought to a focus at the desired point under examination on the stage 3.

In the form of the invention shown in Fig. 2 the member 12a is formed by molding of a plastic material in the manner of the forming of the member 12 in the form of the invention shown in Fig. 1 as previously described.

In this form of the invention the member 12a has the surface 19 in the form of a parabolic curve and this surface is then silvered or made reflective in the same manner as the surfaces 13 and 18 of the form of the invention of Fig. 1 as previously described.

The cover glass 20 of glass and generally similar to the cover glass 14 previously described may be secured to the upper surface of the member 12a by cementing and the dark field member 21 which may be in the form of a paint of suitable color or an opaque disk is secured to the lower surface 22 of the member 12a by cementing or such disk may be secured thereto by molding during the forming of the member 12a.

It will be seen that by molding the principal portion or element 12 or 12a of the illuminator of plastic material, that the forming of precision optical surfaces by grinding and polishing has been eliminated thereby greatly reducing the cost of illuminators of this type and that by cementing on the cover glass 14 or 20, that a hard durable wear resisting surface is provided on the illuminator and as these cover glasses may be formed with flat upper and lower surfaces, they are relatively inexpensive to form and may be easily and quickly secured to the molded elements to thereby provide a relatively inexpensive construction yet possess the various advantages and features of the prior constructions.

From the foregoing it will be seen that I have provided simple, efficient and economical means and process for obtaining all of the objects and advantages of the invention.

Having described my invention, I claim:

1. In a substage illuminator for microscopes having a lens system adapted to be positioned beneath the microscope stage to receive substantially parallel rays of light from a light source and bring such light rays to a focus at substantially the plane of an object on said stage, said lens system comprising a transparent body portion having substantially flat light entrance and exit face means respectively at its lower and upper portions, and having a curved reflective surface means at its peripheral outer surface to direct said light rays to a focus at substantially the plane of an object on said stage, said body being of molded transparent plastic lens medium of lower melting point than glass and having its optical surfaces formed directly by molding in a manner to eliminate the necessity of polishing, opaque means substantially centrally located on the surface of said body portion providing a dark background in alignment with said object to be illuminated on said microscope stage, and a transparent parallel plate cover member on the upper surface of said body portion, said cover member having optical properties and overlying the entire upper surface of said body portion and secured to said upper surface, said cover member being made of glass and having a higher melting point and abrasion resistance than said body portion, whereby engagement of said cover and said microscope stage will not cause injury or damage to said lens system.

2. In a substage illuminator for microscopes having a lens system adapted to be positioned beneath the microscope stage and to receive substantially parallel light rays from a light source and bringing such light rays to a focus at substantially the plane of an object on said stage, said lens system comprising a transparent body portion, a substantially flat light entrance face at its lower portion, an annular exit face at its upper portion, and a reflective depressed inner surface extending downwardly from the inner edge of said annular face on the upper side of said body portion and adapted to receive light rays from a light source and reflect said rays to said reflective peripheral curved outer surface, said reflective depressed inner surface also providing a dark background in alignment with said object on said stage, said body being of molded transparent plastic lens medium of lower melting point than glass and having its optical surfaces formed directly by molding in a manner to eliminate the necessity of polishing, and a transparent parallel plate cover member on said body portion, said cover member having optical properties and overlying the entire upper surface of said body portion and secured to said annular face, said cover member being made of glass and having a higher melting point and abrasive resistance than said body portion whereby engagement of said cover and said microscope stage will not cause injury or damage to said lens system.

3. In a substage illuminator for microscopes having a lens system adapted to be positioned beneath the microscope stage and to receive substantially parallel rays of light from a light source and bring such light rays to a focus at substantially the plane of an object on said stage, said lens system comprising a transparent body portion having substantially flat light entrance and exit face means respectively at its lower and upper portions and having a curved parabolic surface at its peripheral contour to focus said light rays substantially in the plane of an object on said stage, said body being of molded transparent plastic lens medium of lower melting point than glass and having its optical surface formed directly by molding, in a manner to eliminate the necessity of polishing, opaque means on the surface of said body portion providing a dark background in alignment with said object to be illuminated on said microscope stage, a transparent parallel plate cover member on the upper surface of said body portion, said cover member having optical properties and overlying the entire upper surface of said body portion and secured to said upper surface, said cover member being made of glass and having a higher melting point and abrasion resistance than said body portion, whereby engagement of said cover and said microscope stage will not cause injury or damage to said lens system.

JOHN T. ROONEY.

References Cited in the file of this patent

UNITED STATES PATENTS

| Number | Name | Date |
| --- | --- | --- |
| 1,461,367 | Ott et al. | July 10, 1923 |
| 1,613,583 | Berek | Jan. 4, 1927 |
| 2,540,953 | Kessler | Feb. 6, 1951 |

FOREIGN PATENTS

| Number | Country | Date |
| --- | --- | --- |
| 561,503 | Great Britain | May 23, 1944 |